United States Patent
Tago

(10) Patent No.: US 8,300,962 B2
(45) Date of Patent: Oct. 30, 2012

(54) RECORDING DEVICE, RECORDING METHOD, RECORDING MEDIUM, REPRODUCING DEVICE, REPRODUCING METHOD, EDITING DEVICE, AND EDITING METHOD

(75) Inventor: Masako Tago, Tokyo (JP)

(73) Assignee: Sony Corporation, Tokyo (JP)

( * ) Notice: Subject to any disclaimer, the term of this patent is extended or adjusted under 35 U.S.C. 154(b) by 748 days.

(21) Appl. No.: 12/472,061

(22) Filed: May 26, 2009

(65) Prior Publication Data

US 2010/0195920 A1 Aug. 5, 2010

Related U.S. Application Data

(60) Provisional application No. 61/148,699, filed on Jan. 30, 2009.

(51) Int. Cl.
*G06K 9/36* (2006.01)

(52) U.S. Cl. .................. 382/232; 382/233; 382/305

(58) Field of Classification Search ............... 382/232, 382/154, 305, 233; 345/530, 600; 348/36, 348/39; 369/44.27; 375/240.26; 386/329, 386/326; 700/94; 707/695, 913
See application file for complete search history.

(56) References Cited

U.S. PATENT DOCUMENTS

| | | | |
|---|---|---|---|
| 6,631,205 B1 * | 10/2003 | Melen et al. | 382/154 |
| 7,672,378 B2 * | 3/2010 | Ng et al. | 375/240.26 |

FOREIGN PATENT DOCUMENTS

| | | |
|---|---|---|
| JP | 2004-120176 | 4/2004 |
| JP | 2004-208123 | 7/2004 |
| JP | 2004-349731 | 12/2004 |
| JP | 2004-356997 | 12/2004 |
| JP | 2006-13760 | 1/2006 |
| JP | 2008-186287 | 8/2008 |

* cited by examiner

*Primary Examiner* — Anh Hong Do
(74) *Attorney, Agent, or Firm* — Oblon, Spivak, McClelland, Maier & Neustadt, L.L.P.

(57) ABSTRACT

A recording device includes: an encoding unit configured to perform compression encoding on single image data obtained by imaging a subject from a predetermined viewpoint to generate first compression-encoded data, and perform compression encoding on composite image data in which a plurality of image data obtained by imaging the subject from mutually different viewpoints have been composited, to generate second compression-encoded data; a file generating unit configured to generate a first image file including the first compression-encoded data generated at the encoding unit, and generate a second image file including the second compression-encoded data generated at the encoding unit; and a file writing unit configured to write the first image file and the second image file generated at the file generating unit, to a recording medium in a correlated manner.

18 Claims, 12 Drawing Sheets

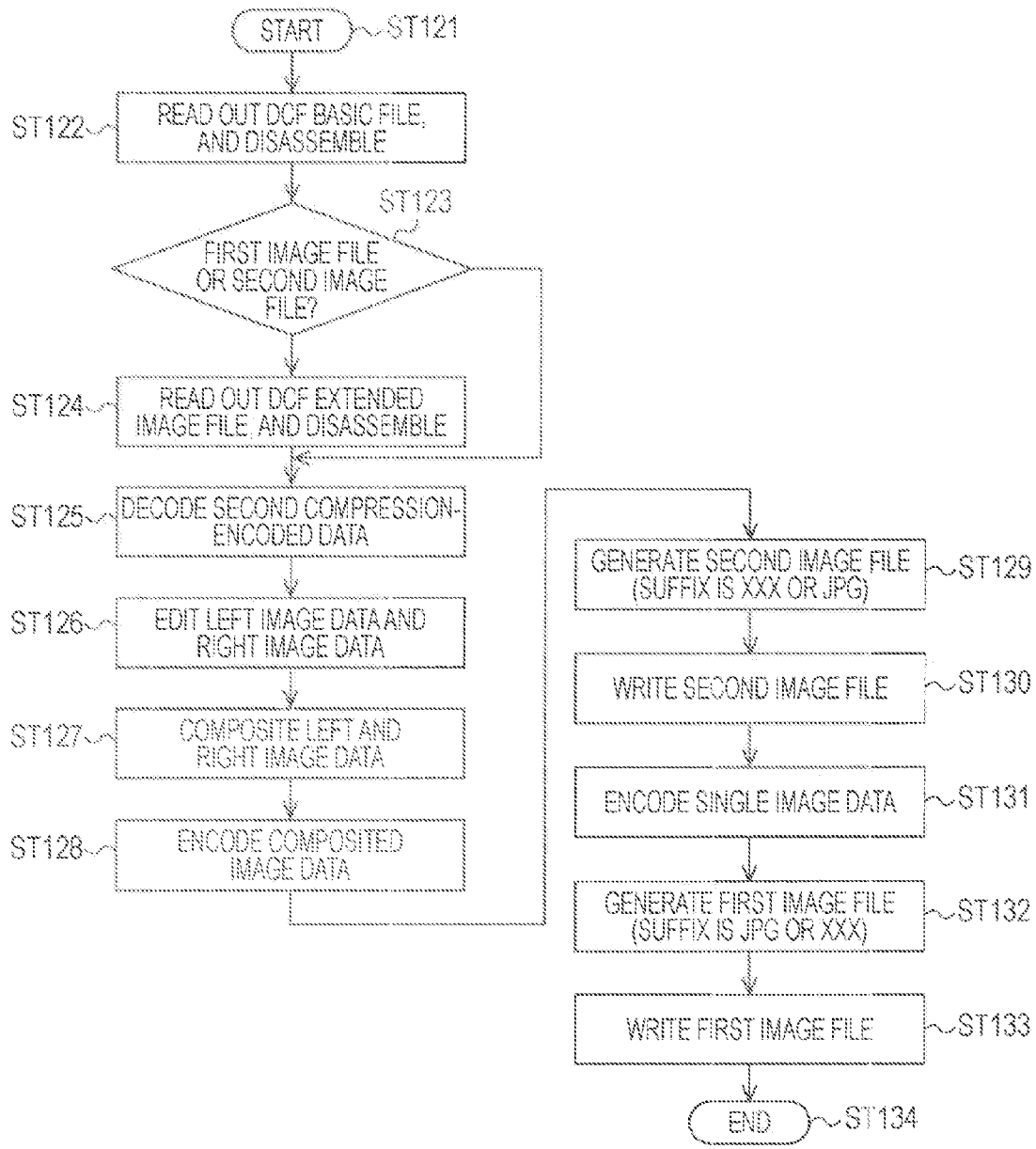

RECORDING DEVICE, RECORDING METHOD, RECORDING MEDIUM, REPRODUCING DEVICE, REPRODUCING METHOD, EDITING DEVICE, AND EDITING METHOD

CROSS-REFERENCE TO RELATED APPLICATIONS

This application claims the benefit of priority from U.S. Provisional Application No. 61/148,699 filed Jan. 30, 2009, the entire contents of which is incorporated herein by reference.

BACKGROUND OF THE INVENTION

1. Field of the Invention

The present invention relates to a recording device, a recording method, a recording medium, a reproducing device, a reproducing method, an editing device, and an editing method suitably applicable to handling of multi-viewpoint image data for displaying a stereopsis image, such as left and right image data, for example. More specifically, the present invention relates to generating, besides an image file including multiple image data obtained by imaging a subject from mutually different viewpoints, a single image data obtained by imaging the subject at a predetermined viewpoint, and writing these files to a recording medium in a correlated manner, thereby enabling display of a stereopsis image with a reproducing device capable of displaying stereopsis images, and enabling good image display even with reproducing devices incapable of display of stereopsis images.

2. Description of the Related Art

Heretofore, there have been in widespread use small electronic devices having imaging functions, such as with digital still cameras, PDAs (Personal Digital Assistants), cellular phones, and the like. With these electronic devices, image data obtained by imaging is formed into files based on predetermined standards such as DCF (Design rule for Camera File system) for example, and saved (e.g., see Japanese Unexamined Patent Application Publication No. 2004-208123).

DCF is a standard laid forth by JEIDA (Japanese Electronic Industry Development Association), which defines folder structure, recording format to memory, and so forth, based on Exif-JPEG (Exchangeable Image File Format-Joint Photographic Experts Group), and ensures compatibility among different device models. With digital still cameras which are DCF capable, images can be exchanged even if the manufacturer or device model is not the same, and recording media can be printed by just connecting to a compatible printing, without going through a personal computer. Also, information such as imaging device model, date of imaging, thumbnail, and so forth, are stored in a DCF-format image file.

SUMMARY OF THE INVENTION

In recent years, there have been proposed electronic devices having the above-described imaging functions, performing multi-viewpoint imaging to display a stereopsis image, such as with left and right viewpoints, for example. In this case, how to write the let and right image data as a file in a recording medium is a problem. For example, an arrangement wherein the left and right image data are composited and an image file including this composited image data is written to the recording media as a DCF basic file has been proposed. However, there is a drawback that with the case of this proposal, a composite image with the left and right images arrayed next to each other is displayed when using reproducing devices not capable of displaying stereopsis images.

It has been found desirable to enable display of a stereopsis image with reproducing devices capable of display of stereopsis images, and to also obtain good images even with reproducing devices not capable of display of stereopsis images.

A recording device according to an embodiment of the present invention includes: an encoding unit configured to perform compression encoding on single image data obtained by imaging a subject from a predetermined viewpoint to generate first compression-encoded data, and perform compression encoding on composite image data in which multiple image data obtained by imaging the subject from mutually different viewpoints have been composited, to generate second compression-encoded data; a file generating unit configured to generate a first image file including the first compression-encoded data generated at the encoding unit, and generate a second image file including the second compression-encoded data generated at the encoding unit; and a file writing unit configured to write the first image file and the second image file generated at the file generating unit, to a recording medium in a correlated manner.

With the above configuration, first compression-encoded data and second compression-encoded data are generated by the encoding unit. The first compression-encoded data is generated by performing compression encoding on single image data obtained by imaging a subject from a predetermined viewpoint. The second compression-encoded data is generated by performing compression encoding on multiple image data obtained by imaging a subject from mutually different viewpoints, e.g., composite image data in which left and right image data obtained by imaging the subject from left and right viewpoints have been composited. For example, the single image data may be representative image data representing the multiple image data, and selected from the multiple image data. In this case, all that has to be present is the multiple image data, and other image data does not have to be prepared.

The file generating unit generates a first image file including the first compression-encoded data, and a second image file including the second compression-encoded data. For example, the second image file may include metadata, and in the event that the single image data is selected from the multiple image data as described above, the metadata may include information indicating which of the multiple image data the single image data is. In this case, which of the multiple image data included in the second image file the single image data included in the first image file is, can be readily understood from the metadata.

Also, for example, the second image file may include metadata, and in the event that the single image data is selected from the multiple image data as described above, the metadata may include information indicating which of the multiple image data the single image data is desired to be selected as. In this case, which of the multiple image data included in the second image file the single image data included in the first image file is desired to be, can be readily understood from the metadata.

For example, the first image file may include metadata, with the metadata including the file name of the second image file. In this case, the file name of the second image file can be readily understood from the metadata of the first image file. Also, for example, the second image file may include metadata, with the metadata including the file name of the first image file. In this case, the file name of the first image file can be readily understood from the metadata of the second image file.

For example, the first image file may be generated as a DCF basic file or a DCF extended image file, and the second image file generated as a DCF extended image file or a DCF basic file. The DCF basic file and the DCF extended image file are distinguished by the suffix of the file names. That is to say, the suffix of the file name of a DCF basic file is "JPG", and the suffix of the file name of a DCF extended image file is other than "JPG" and "THM".

For example, the recording device may further include a user operating unit whereby a user selects which of the first image file and the second image file to take as the DCF basic file and which to take as the DCF extended image file. In this case, for example, with a reproducing device capable of display of stereopsis images wherein the DCF basic file is reproduced first, if the second image file including multiple image data is a DCF basic file, this second image file is reproduced first, and display of stereopsis images is performed speedily.

Also, the file writing unit writes the first image file and second image file in the recording medium in a correlated manner. For example, in the event that one of the first image file and second image file is a DCF basic file, and the other is a DCF extended image file, as described above, the first image file and second image file are written into the same DCF directory of the recording medium.

Thus, with the above configuration, a first image file including single image data obtained by imaging a subject from a predetermined viewpoint is generated besides a second image file including multiple image data obtained by imaging a subject from mutually different viewpoints, and these files are written to a recording medium in a correlated manner, enabling stereopsis images to be displayed with reproducing devices capable of display of stereopsis images, and enabling good image display to be made even with reproducing devices not capable of display of stereopsis images.

According to an embodiment of the present invention, a recording medium records, in a correlated manner, a first image file including first compression-encoded data generated by performing compression encoding on single image data obtained by imaging a subject from a predetermined viewpoint, and a second image file including second compression-encoded data generated by performing compression encoding on multiple image data obtained by imaging the subject from mutually different viewpoints.

With this configuration, a first image file including single image data obtained by imaging a subject from a predetermined viewpoint, as well as a second image file including multiple image data obtained by imaging a subject from mutually different viewpoints, are written to a recording medium in a correlated manner. This enables stereopsis images to be displayed with reproducing devices capable of display of stereopsis images, and enables good image display to be made even with reproducing devices not capable of display of stereopsis images.

A reproducing device according to an embodiment of the present invention, for handling a recording medium in which is recorded, in a correlated manner, a first image file including first compression-encoded data generated by performing compression encoding on single image data obtained by imaging a subject from a predetermined viewpoint, and a second image file including second compression-encoded data generated by performing compression encoding on multiple image data obtained by imaging the subject from mutually different viewpoints, includes: a file readout unit configured to read out, from the recording medium, at least the first image file or the second image file; a decoding unit configured to decode compression-encoded data included in an image file read out by the file readout unit, and obtaining image data; and an image display unit configured to display image data obtained by the decoding unit.

With this configuration, at least the first image file or second image file are read out from the recording medium, and image display is performed. For example, image display is performed with the single image data included in the first image file, and subsequently display is performed of a stereopsis image with the multiple image data included in the second file. Also, for example, display is performed of a stereopsis image with the multiple image data included in the second file, without image display being performed with the single image data included in the first image file.

An editing device according to an embodiment of the present invention, for handling a recording medium in which is recorded, in a correlated manner, a first image file including first compression-encoded data generated by performing compression encoding on single image data obtained by imaging a subject from a predetermined viewpoint, and a second image file including second compression-encoded data generated by performing compression encoding on multiple image data obtained by imaging the subject from mutually different viewpoints, includes: a file readout unit configured to read out, from the recording medium, at least the second image file; a decoding unit configured to decode compression-encoded data included in the second image file read out by the file readout unit, and obtaining the multiple image data; an image data processing unit configured to subject the multiple image data obtained by the decoding unit to editing processing; an encoding unit configured to perform compression encoding on composite image data in which the multiple image data processed by the image data processing unit have been composited, to generate second compression-encoded data, and performing compression encoding on single image data which is representative image data representing the multiple image data and which is selected from the multiple image data, to generate the first compression-encoded data; a file generating unit configured to generate the first image file including the first compression-encoded data generated at the encoding unit, and generating the second image file including the second compression-encoded data generated at the encoding unit; and a file writing unit configured to write the first image file and the second image file generated at the file generating unit, to a recording medium in a correlated manner.

With this configuration, the second image file is read out from the recording medium, and editing processing is performed on the multiple image data included in this second image file. Editing processing is, for example, processing for cropping a portion of the image, processing for enlarging a portion of the image, processing for reducing the image, processing for changing the brightness, chromaticity, hue, etc., of the image, and so forth. Then, a second image file including the multiple image data which has been subjected to editing processing is generated, and also a first image file including the single image data selected from the multiple image data which has been subjected to editing processing is generated, and these first and second files are written to the recording medium. In this way, the post-editing-processing single image data is selected from the post-editing-processing multiple image data, so the single image data included in the post-editing-processing first image file and the multiple image data included in the second image file agree.

According to the above configurations, an image file including single image data obtained by imaging a subject from a predetermined viewpoint, as well as an image file including multiple image data obtained by imaging a subject from mutually different viewpoints, are generated, and these files are written to a recording medium in a correlated manner, enabling stereopsis images to be displayed with reproducing devices capable of display of stereopsis images, and enabling good image display to be made even with reproducing devices not capable of display of stereopsis images.

BRIEF DESCRIPTION OF THE DRAWINGS

FIG. 13 is a flowchart illustrating an example of editing control at a control unit of the editing device.

DESCRIPTION OF THE PREFERRED EMBODIMENTS

Embodiments of the invention will be described below with reference to the drawings. In the following, description will proceed in the order of recording device, reproducing device, and editing device.

Recording Device

Figure 1:
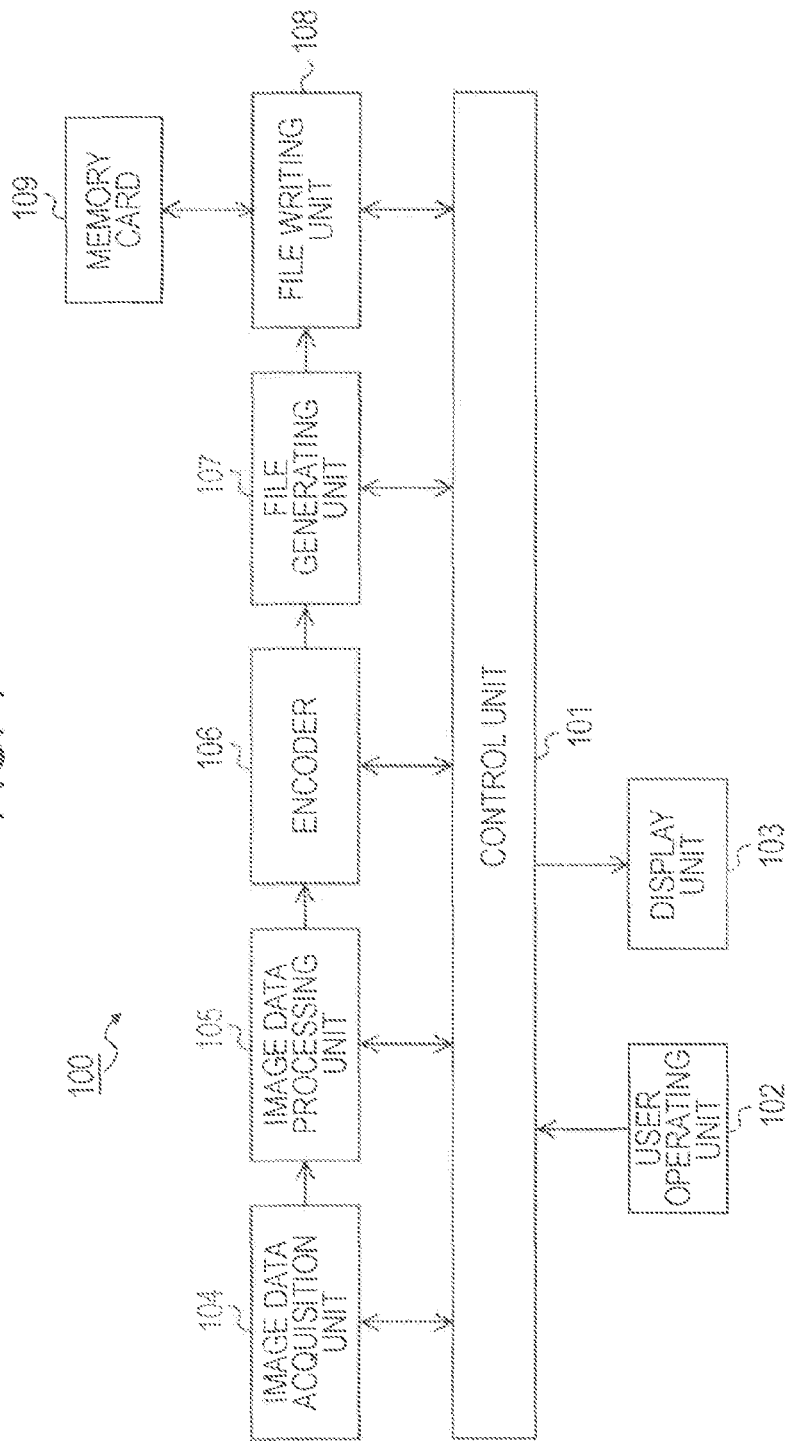
FIG. 1 is a block diagram illustrating a configuration example of a recording device as an embodiment of the present invention.

FIG. 1 illustrates a configuration example of a recording device 100. This recording device 100 has a control unit 101, user operating unit 102, display unit 103, image data acquisition unit 104, image data processing unit 105, encoder 106, file generating unit 107, and file writing unit 108.

The control unit 101 controls the operations of the parts of the recording device 100. The user operating unit 102 and display unit 103 make up a user interface, and are connected to the control unit 101. The user operating unit 102 is configured of keys or buttons disposed to an unshown housing of the recording device 100, or of a touch panel disposed on the display face of the display unit 103, or the like. The display unit 103 is configured of a display device such as an LCD (Liquid crystal Display) or the like disposed to the unshown housing of the recording device 100.

The image data acquisition unit 104 acquires multiple image data obtained by imaging a subject from mutually different viewpoints for display of a stereopsis image; left and right data acquired by imaging a subject from left and right perspectives in this embodiment. This image data acquisition unit 104 is configured of a camera, for example. In a case of being configured of a single camera, left and right image data can be acquired with a single imaging in a composited state, by using an adapter (lens splitter, mirror, etc.). Also, in a case of being configured of a single camera, left and right image data can be sequentially obtained by sequentially moving the single camera to the left and right viewpoints and performing imaging. Also, in a case of being configured of two cameras, the left and right image data can be obtained simultaneously by positioning the two cameras at the left and right viewpoints and performing imaging. Also, the image data acquisition unit 104 is configured of a terminal for inputting image data, for example. Left and right image data generated at another device is input to the terminal. The left and right image data includes left and right image data obtained by imaging with a camera, left and right image data generated by computer graphics (hereinafter may be abbreviated to "CG"), and so forth.

The image data processing unit 105 composites the left and right image data acquired at the image data acquisition unit 104 and generates composite image data. The image data processing unit 105 has left image data positioned to the left side of each line, and right image data positioned to the right side of each line, and composite image data is generated.

The encoder 106 performs JPEG compression encoding on one image data of the left and right image data acquired at the image data acquisition unit 104 (single image data which is representative image data representing the left and right image data), and generates a first compression-encoded data. Also, the encoder 106 subjects the composite image data generated at the image data processing unit 105 to JPEG compression encoding, and generates a second compression-encoded data.

The file generating unit 107 generates a first image file including the first compression-encoded data generated at the encoder 106, as a DCF basic file. The file generating unit 107 also generates a second image file including the second compression-encoded data generated at the encoder 106, as a DCF extended image file.

Figures 2, 3:
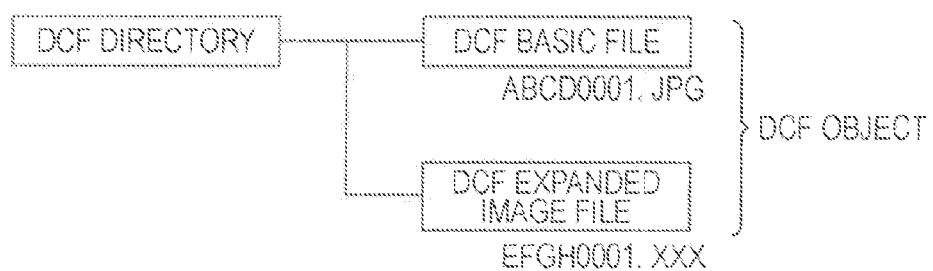
FIG. 2 is a diagram for describing the relation between a DCF basic file and a DCF extended image file.
FIG. 3 is a diagram for describing the configuration of a DCF file name.

Now, the relation between a DCF basic file and a DCF extended image file will be described with reference to FIG. 2. A DCF basic file and DCF extended image file exist under the same DCF directory. Note that while not shown in the drawing, the DCF directory exists under a directory called DCIM, which exists under a root directory. The file name of a DCF file (DCF basic file, DCF extended image file, etc.) is configured of "4 letters+4-digit number+suffix", as shown in FIG. 3. The four letters are an arbitrary text string of a combination of uppercase alphabetical letters, numerals, and underscore, and is called free text. The 4-digit number is a number from 0001 to 9999, and is called a file No. Also, the suffix of a DCF basic file, is "JPG", and the suffix of a DCF extended image file is other than "JPG" and "THM".

A file group existing within the same DCF directory and having the same file No. is called a DCF object. The above-described DCF basic file and DCF extended image file generated at the file generating unit 107 have file names given thereto so as to configure a DCF object. For example, as shown in FIG. 2, in the event that the file name of the DCF basic file (first image file) is "ABCD0001.JPG", the file name of the DCF extended image file (second image file) will have the same file No., such as "EFGH0001.XXX".

Figure 4:
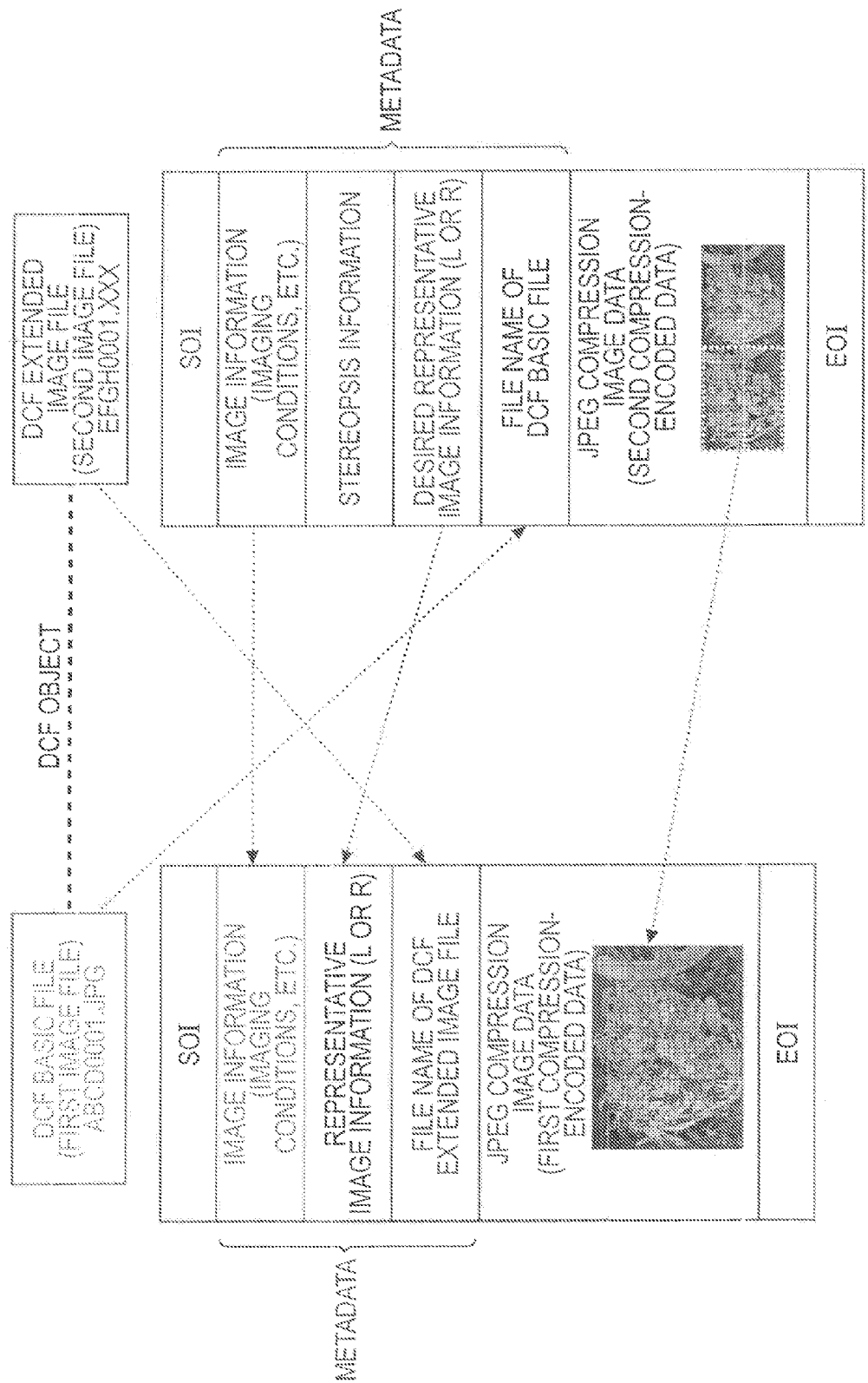
FIG. 4 is a diagram illustrating a configuration example of a DCF basic file and a DCF extended image file.

FIG. 4 illustrates file configuration examples of a DCF basic file and DCF extended image file. The DCF basic file (first image file) is made up of an SOI (Start Of Image), metadata, JPEG compressed image data (first compression-encoded data), and an EOI (End Of Image). The metadata includes image information such as shooting conditions and the like, information indicating which of the left and right image data that the signal image data is (representative image information) and file name of the DCF extended image file.

Also, the DCF extended image file (second image file) is made up of an SOI, metadata, JPEG compressed image data (second compression-encoded image data), and an EOI. The metadata includes image information such as shooting conditions and the like, stereopsis information, information regarding which of the left and right image data is desired as single image data to be included in the above DCF basic file (desired representative image information), and the file name of the DCF basic file. Note that the "desired representative image information" included in the DCF extended image file may not typically agree with the "representative image information" included in the DCF basic file.

As described above, representative image information indicating which of the left and right image data is the single image data, is included in the metadata of the DCF basic file and the metadata of the DCF extended image file, so which of the left and right image data the single image data is, can be readily found from the metadata.

Also, as described above, the file name of the DCF extended image file is included in the metadata of the DCF basic file, and also the file name of the DCF basic file is included in the metadata of the DCF extended image file, so the file name of the DCF extended image file is readily found from the metadata of the DCF basic file, and in the same way, the file name of the DCF basic file can be readily found from the metadata of the DCF extended image file.

Returning to FIG. 1, the file writing unit 108 correlates and writes the first image file (DCF basic file) and second image file (DCF extended image file) generated at the file generating unit 107, to a memory card 109. In this case, the first image file and the second image file are written to the same DCF directory in the memory card 109. The memory card 109 configures a recording medium.

The operations of the recording device 100 shown in FIG. 1 will now be described. At the image data acquisition unit 104, acquisition of left and right image data, obtained by imaging a subject from let and right viewpoints, is performed. The left and right image data acquired with the image data acquisition unit 104 is supplied to the image data processing unit. At this image data processing unit 105, the left and right image data is composited and composite image data is generated.

Of the left and right image data acquired by the image data acquisition unit 104, one image data is supplied to the encoder 106 as representative image data (single image at) representing the left and right image data. Also, the composite image data generated at thee image data processing unit 105 is supplied to the encoder 106. At the encoder 106, the single image data is subjected to JPEG compression encoding, and the first compression-encoded data is generated. Also, at the encoder 106, the composite image data is subjected to JPEG compression encoding, and the second compression-encoded data is generated.

The first compression-encoded data and the second compression-encoded data generated at the encoder 106 is supplied to the file generating unit 107. At the file generating unit 107, the first image file including the first compression-encoded data (JPEG compressed image data) is generated as the DCF basic file. In this case, as shown in FIG. 4, metadata including the image information, representative image information, file name of DCF extended image file, and so forth, is added to the first compression-encoded data, and further an SOI and EOI are added before and after, thereby generating the DCF basic file (first image file).

Also, at the file generating unit 107, the second image file including the second compression-encoded data (JPEG compressed image data) is generated as the DCF extended image file. In this case, as shown in FIG. 4, metadata including the image information, stereopsis information, desired representative image information, file name of DCF basic file, and so forth, is added to the second compression-encoded data, and further an SOI and EOI are added before and after, thereby generating the DCF extended image file (second image file).

The first image file (DCF basic file) and the second image file (DCF extended image file) generated at the file generating unit 107 are supplied to the file writing unit 108. At the file writing unit 108, the first image file and second image file generated at the file generating unit 107 are correlated and written to the memory card 109. In this case, the first image file and the second image file are written to the same DCF directory in the memory card 109.

As described above, with the recording device 100 shown in FIG. 1, besides the second image file including the left and firth image data (DCF extended image file), the first image file (DCF basic file) including the single image data is recorded. Accordingly, with a reproducing device capable of displaying stereopsis images, good display of stereopsis images can be performed using the second image file, and on the other hand, with a reproducing device not capable of displaying stereopsis images, good display of images can be performed using the first image file.

Also, with the recording device 100 shown in FIG. 1, the single image data included in the first image file (DCF basic file) is one image data selected from the left and right image data included in the second image file (DCF extended image file). Accordingly, the image data acquisition unit 104 only has to acquire the left and right image data, and dedicated image data for the single image data does not have to be acquired.

Note that with the recording device 100 shown in FIG. 1, while the first image file is generated as the DCF basic file and the second image file is generated as the DCF extended image file at the file generating unit 107, a configuration may be made wherein the user can select which of the first image file and the second image file is to be the DCF basic file and which is to be the DCF extended image file. In this case, the user performs selection operations at the user operating unit 102.

In the event that selection is made to the effect that the second image file is the DCF basic file and the first image file is the DCF extended image file, at the file generating unit 107 the first image file is generated as the DCF extended image file and the second image file is generated as the DCF basic file, opposite to the above-described operations. In this case, with a reproducing device capable of display of stereopsis images where the DCF basic file is displayed first, for example, the second image file including the left and right image file is displayed first, so display of stereopsis images is performed speedily.

Figure 5:
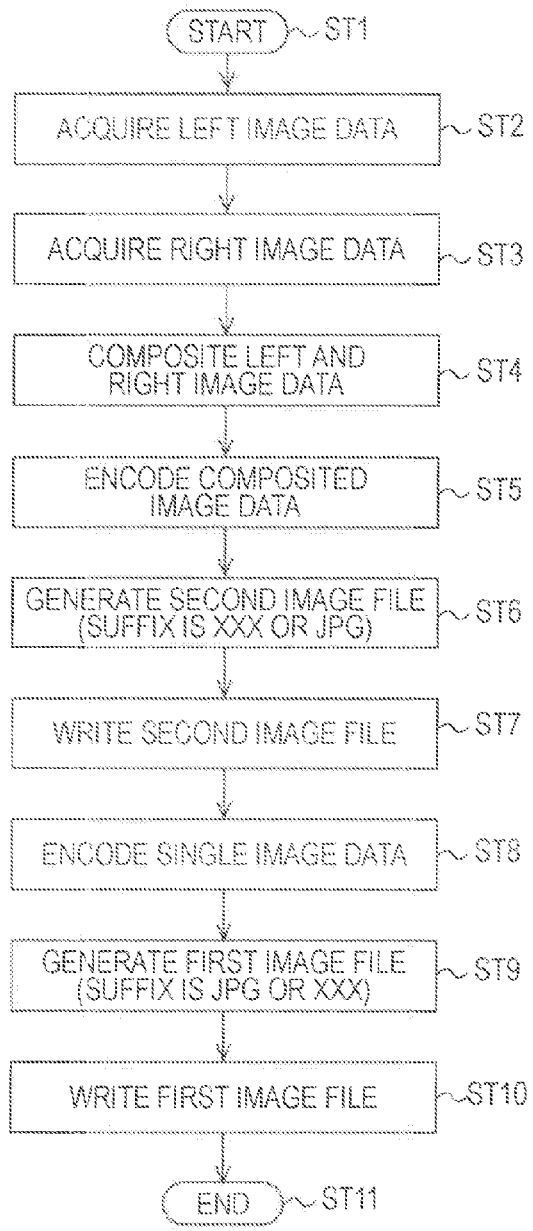
FIG. 5 is a flowchart illustrating an example of recording control at a control unit of the recording device.

The flowchart shown in FIG. 5 illustrates an example of recording control at the control unit 101 of the recording device 100 shown in FIG. 1.

In step S1, the control unit 101 starts recording control, and then goes to step S2.

In step S2, the control unit 101 acquires the left image data with the image data acquisition unit 104.

Subsequently, in step S3, the control unit 101 acquires the right image data with the image data acquisition unit 104.

Next, in step S4, the control unit 101 generates composite image data where the left and right image data have been composited, by the image data processing unit 105.

Subsequently, in step S5, the control unit 101 subjects the composited image data generated in step S4 to JPEG compression encoding, and generates second compression-encoded data (JPEG compressed image data).

Next, in step S6, the control unit 101 generates a second image file including the second compression-encoded data generated in step S5, as a DCF extended image file (with suffix "XXX") or a DCF basic file (with suffix "JPG").

Then, in step S7, the control unit 101 writes the second image file generated in step S6 to a predetermined DCF directory in the memory card 109, with the file writing unit 108.

Next, in step S8, the control unit 101 performs JPEG compression encoding on the left image data acquired in step S2 or the right image data acquired in step S3, and generates first compression-encoded data (JPEG compressed image data).

Next, in step S9, the control unit 101 generates the first image file including the first compression-encoded data generated in step S8 as the DCF basic file (with suffix "JPG") or DCF extended image file (with suffix "XXX"). In step S10 the control unit 101 then writes the first image file generated in step S9 to the above-described predetermined DCF directory in the memory card 109, with the file writing unit 108.

Following the processing in step S10, in step S11 the control unit 101 ends the recording control.

Reproducing Device

Figure 6:
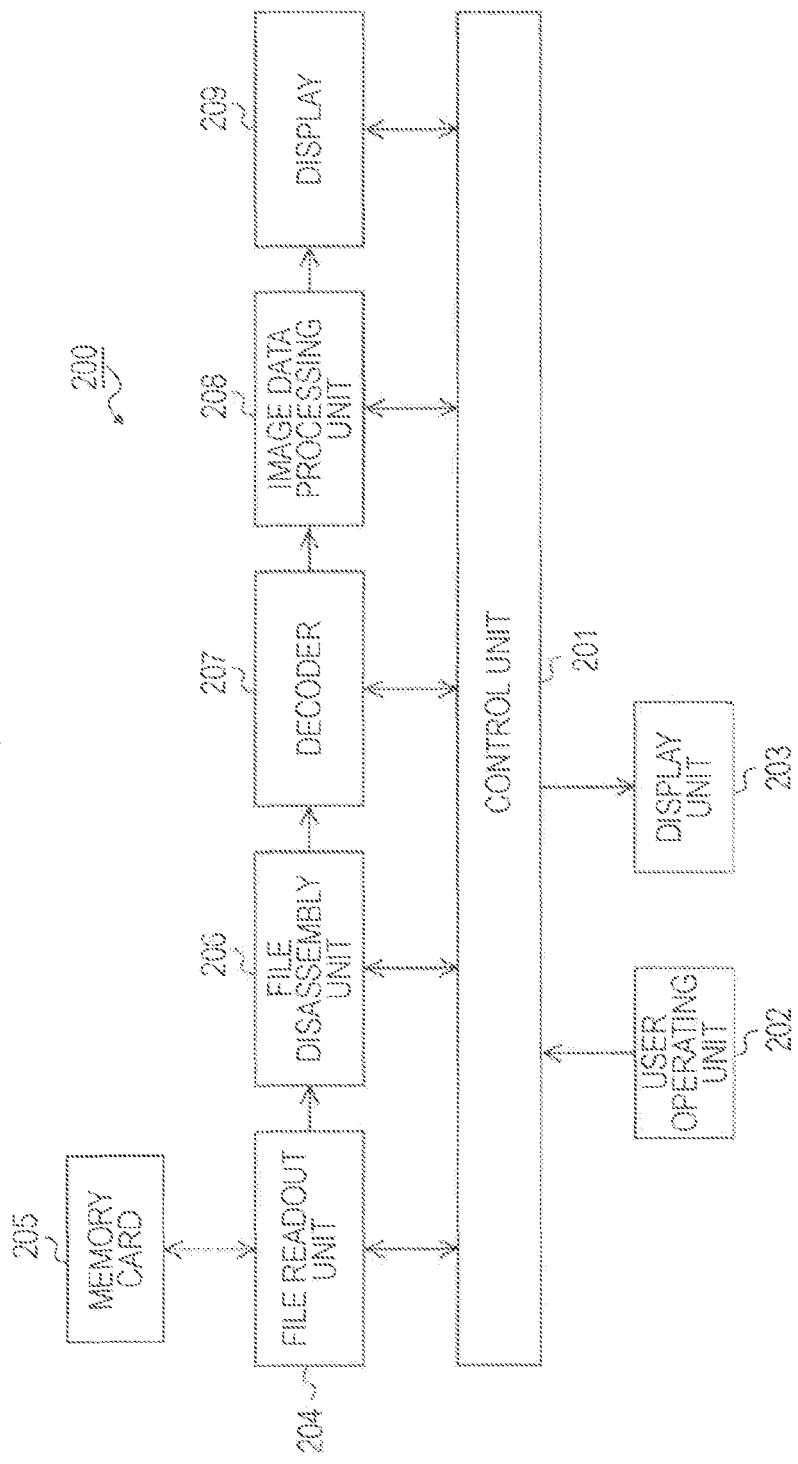
FIG. 6 is a diagram illustrating a configuration example of a reproducing device as an embodiment of the present invention.

FIG. 6 illustrates a configuration example of the reproducing device 200. This reproducing device 200 includes a control unit 201, a user operating unit 202, a display unit 203, a file readout unit 204, a file disassembly unit 206, a decoder 207, an image data processing unit 208, and a display 209.

The control unit 201 controls the operations of the parts of the reproducing device 200. The user operating unit 202 and display unit 203 make up a user interface, and are connected to the control unit 201. The user operating unit 202 is configured of keys or buttons disposed to an unshown housing of the reproducing device 200, or of a touch panel disposed on the display face of the display unit 203, or the like. The display unit 203 is configured of a display device such as an LCD or the like disposed to the unshown housing of the reproducing device 200.

The memory card makes up a recording medium. This memory card 205 corresponds to the memory card 109 in the recording device 100 described above. The memory card 205 records the first image file including the single image data, and the second image file including the left and right image data, in a correlated manner. For example, the first image file is the DCF basic file or the DCF extended image file, and on the other hand the second image file is the DCF extended image file or the DCF basic file, with the first image file and the second image file being recorded in the memory card in a state of making up a DCF object.

The file readout unit 204 reads out file management information from the memory card 205 upon the memory card 205 being mounted, which is supplied to the control unit 201. the control unit 201 supplies display signals for displaying the file name of the files recorded in the memory card 205, to the display unit 206, so that the file names are displayed on the display unit 203. The user can select the DCF object to be reproduced from the user operating unit 202, making reference to the file names displayed on the display unit 203. The file readout unit 204 also reads out the DCF files relating to the DCF object which the user has selected as described above. The file readout unit 204 reads out either one or both of the first image file and second image file, under reproduction control. Note that as described above, there are cases where the first image file is the DCF basic file and the second image file is the DCF extended image file and cases where the opposite is true. Details of reproduction control will be described later.

The file disassembly unit 206 disassembles the DCF files (DCF basic file and DCF extended image file) read out by the file readout unit 204, supplies the metadata to the control unit 201, and supplies the JPEG compressed image data to the decoder 207 as appropriate. The decoder 207 performs decoding on the compression-encoded data supplied from the file disassembly unit 206, and obtains image data. In the event that the JPEG compressed image data is the first compression-encoded data included in the first image file, the single image data is obtained at the decoder 207. On the other hand, in the event that the JPEG compressed image data is the second compression-encoded data included in the second image file, the composited image data, and accordingly the left and right image data, is obtained at the decoder 207.

In the event that the image data obtained at the decoder 207 is the left and right image data, the image data processing unit 208 performs processing for rearranging the left and right image data, i.e., processing for obtaining image data for displaying a stereopsis image. The display 209 is a flat-panel display configured of an LCD, PDP (Plasma Display Panel), etc., for example. This display 209 displays an image from the single image data obtained at the decoder unit 207, or a stereopsis image from the image data obtained at the image data processing unit 208.

The operations of the reproducing device 200 shown in FIG. 6 will now be described. At the file readout unit 204, the DCF files relating to the DCF object which the user has selected (DCF basic file and DCF extended image file) are read out. In this case, the file readout unit 204 reads out either one or both of the first image file and second image file, depending on reproduction control. Here, the first image file includes the single image data, and the second image file includes the left and right image data. The DCF files read out at the file readout unit 204 are supplied to the file disassembly unit 206.

The file disassembly unit 206 disassembles the DCF files read out by the file readout unit 204, and metadata and JPEG compression-encoded image data are obtained. The metadata is supplied to the control unit 201. The control unit 201 can obtain various types of information relating to the DCF file read out with the file readout unit 204, from this metadata. The JPEG compressed image data is supplied to the decoder 207 as appropriate. That is to say, in the event that the JPEG compressed image data is the second compression-encoded data relating to the left and right image data, this is typically supplied to the decoder 207, but in the event that the JPEG compressed image data is the first compression-encoded data relating to the single image data, this is supplied to the decoder 207 only in the event of displaying the image according to the single image data.

The decoder 207 performs decoding on the compression-encoded data supplied from the file disassembly unit 206, and obtains image data. In the event that the JPEG compressed image data is the first compression-encoded data included in the first image file, the single image data is obtained at the decoder 207. On the other hand, in the event that the JPEG compressed image data is the second compression-encoded data included in the second image file, the composited image data, and accordingly the left and right image data, is obtained at the decoder 207.

The single image data obtained at the decoder 207 is supplied to the display 209 without being processed at the image data processing unit 208. An image (still image) according to the single image data is displayed at the display 209. Also, the left and right image data obtained at the decoder 207 is supplied to the image data processing unit 208. The image data processing unit 208 performs processing for rearranging the left and right image data, etc., yielding image data for displaying a stereopsis image. The image data is supplied to the display 209, and a stereopsis image (still image) is displayed on the display 209.

Figure 7:
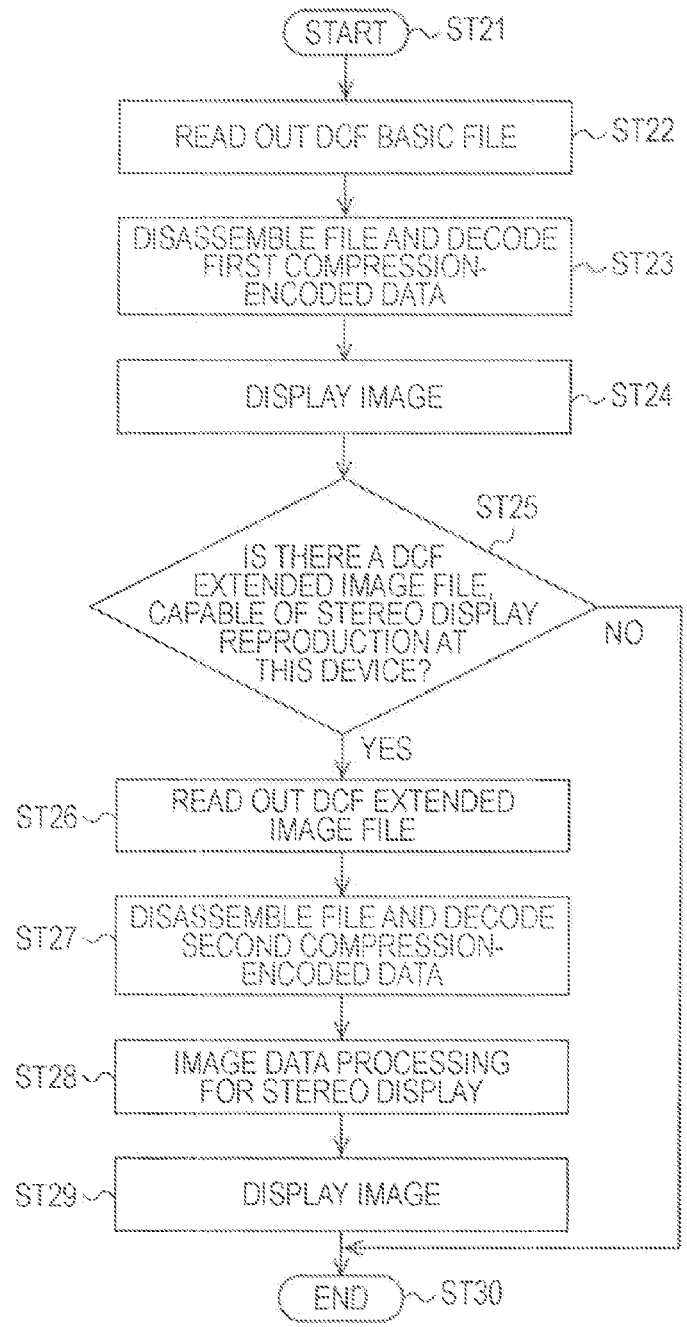
FIG. 7 is a flowchart illustrating an example of reproduction control at a control unit of a reproduction device having a display function of stereopsis images.

The flowchart in FIG. 7 illustrates an example of reproduction control at the control unit 201 of the reproducing device 200 in FIG. 6. Note that this example of reproducing is applied to a case wherein the first image file is recorded as a DCF basic file and the second image file is recorded as a DCF extended image file in the memory card 205.

The control unit 201 starts reproduction control in step S21, following which the flow proceeds to step S22. The control unit 201 then in step S22 reads out the DCF basic file (first image file) from the memory card 205 with the image data readout unit 204.

Next, in step S23, the control unit 201 disassembles the DCF basic file read out in step S22 with the file disassembly unit 206, and obtains metadata and JPEG compressed image data (first compression-encoded data). Also, in step S23, the control unit 201 performs decoding of the first compression-encoded data by the decoder 207, and obtains the single image data.

In step S24, the control unit 201 displays the image from the single image data (still image) obtained in step S23 on the display 209.

Next, in step S25, the control unit 201 determines whether or not there is a DCF extended image file corresponding to the memory card 205 (capable of stereo display at this device). In the event that there is a DCF extended image file, the file name and the like of the DCF extended image file is included in the metadata of the DCF basic file. Accordingly, the control unit 201 can determine whether or not there is a DCF extended image file corresponding to the memory card 205, based on the metadata of the DCF basic file.

In the event of determining that there is a DCF extended image file, the control unit 201 reads out the DCF extended image file from the memory card 205 with the file readout unit 204 in step S26.

In step S27, the DCF extended image file read out in step S26 is disassembled by the file disassembly unit 206, and the metadata and JPEG compressed image data (second compression-encoded data) is obtained. Also, in step S27 the control unit 201 decodes the second compression-encoded data and obtains left and right image data.

Next, in step S28, the control unit 201 processes the left and right image data obtained in step S27 with the image data processing unit 208, and obtains image data for displaying a stereopsis image.

In step S29, the control unit 201 displays a stereopsis image (still image) from the image data obtained in step S28 on the display 209. At this time, the image display on the display 209 changes from the display of the single image data (representative image data) to the display of the stereopsis image (still image).

Following the processing of step S29, in step S30 the control unit 201 ends the reproducing processing. Note that in the event that determination is made in the above step S25 that there is no DCF extended image file, the control unit 201 immediately goes to step S30 and ends the reproducing control.

Note that with the reproduction control example shown in the flowchart in FIG. 7, an arrangement has been illustrated of automatic transition from the image from the single image data (representative image data) to the display of stereopsis image from the left and right image data. However, a case may be conceived wherein the user can perform on/off of the stereopsis image display mode. In this case, image display from the single image data is performed in step S24, following which determination is made regarding whether or not the stereopsis image display mode is on, and control is performed such that in the event of on the flow proceeds to step S25, while if off, the flow proceeds to step S30.

Figure 8:
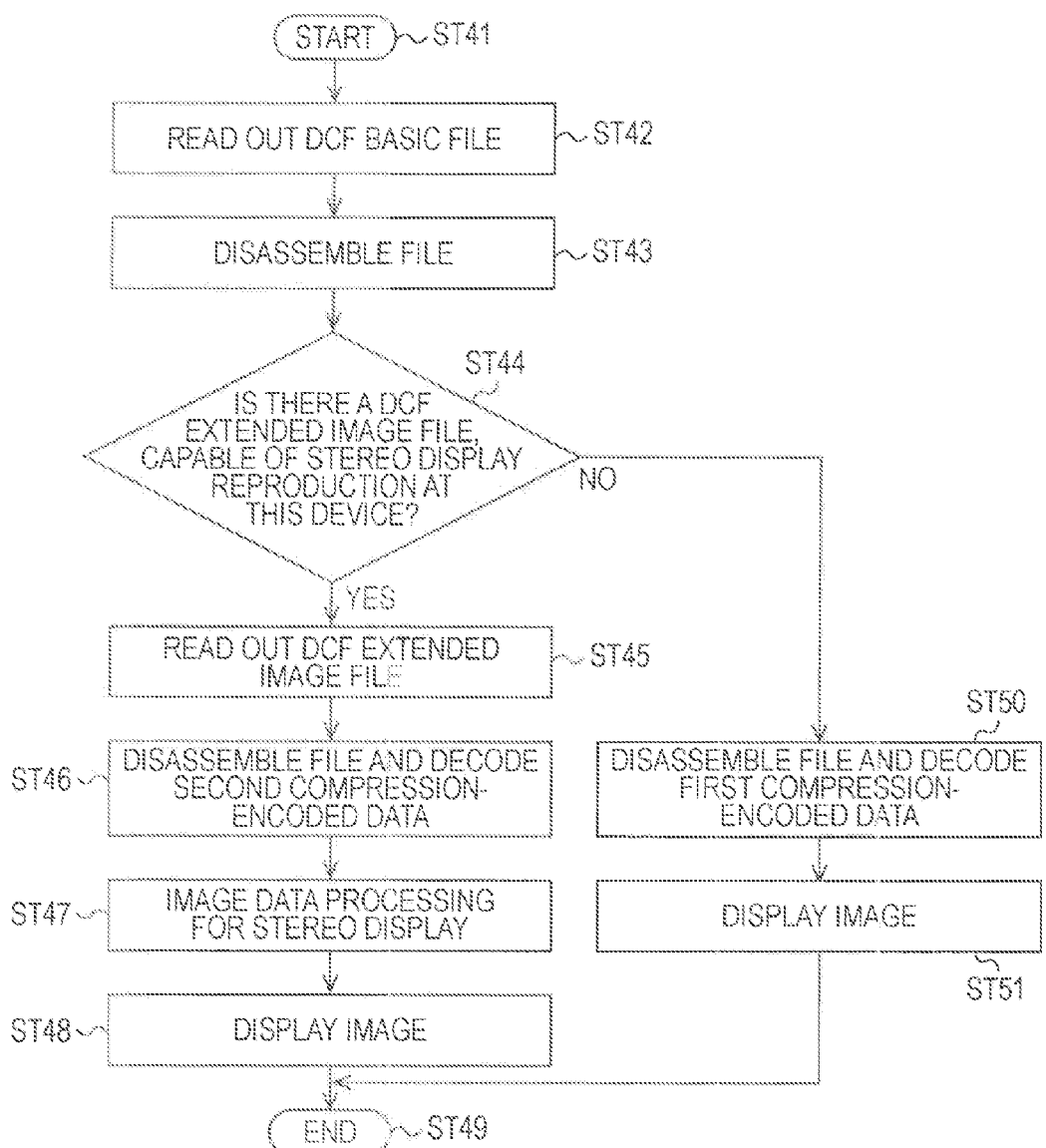
FIG. 8 is a flowchart illustrating another example of reproduction control at a control unit of a reproduction device having a display function of stereopsis images.

The flowchart in FIG. 8 illustrates another example of reproduction control at the control unit 201 of the reproducing device 300 in FIG. 6. Note that this example of reproducing is applied to a case wherein the first image file is recorded as a DCF basic file and the second image file is recorded as a DCF extended image file in the memory card 205.

The control unit 201 starts reproduction control in step S41, following which the flow proceeds to step S42.

The control unit 201 then in step S42 reads out the DCF basic file (first image file) from the memory card 205 with the image data readout unit 204.

Next, in step S43, the control unit 201 disassembles the DCF basic file read out in step S42 with the file disassembly unit 206, and obtains metadata and JPEG compressed image data (first compression-encoded data).

In step S44, the control unit 201 determines whether or not there is a DCF extended image file corresponding to the memory card 205 (capable of stereo display at this device), based on the metadata obtained in step S43.

In step S45, the event of determining that there is a DCF extended image file, the control unit 201 reads out the DCF extended image file from the memory card 205 with the file readout unit 204.

In step S46, the control unit 201 disassembles the DCF extended image file read out in step S46 by the file disassembly unit 206, and the metadata and JPEG compressed image data (second compression-encoded data) are obtained. Also, in step S46 the control unit 201 decodes the second compression-encoded data and obtains left and right image data.

Next, in step S47, the control unit 201 processes the left and right image data obtained in step S46 with the image data processing unit 208, and obtains image data for displaying a stereopsis image.

In step S48, the control unit 201 displays a stereopsis image (still image) from the image data obtained in step S47 on the display 209.

Following the processing of step S48, in step S49 the control unit 201 ends the reproducing processing.

Note that in the event that determination is made in the above step S44 that there is no DCF extended image file, in step S50 the control unit 201 decodes the first compression-encoded data obtained in step S43 with the decoder 207, and obtains the single image data.

In step S51, the control unit 201 displays an image (still image) from the signal image data obtained in step S50. Subsequently, in step S49, the control unit 201 ends the reproducing processing.

Note that with the reproduction control example shown in the flowchart in FIG. 8, an arrangement has been illustrated wherein, in the event that DCF extended image file exists, display of the stereopsis image from the left and right image data is automatically performed. However, a case may be conceived wherein the user can perform on/off of the stereopsis image display mode. In this case, following the processing of step S43, determination is made in step S44 regarding whether or not the stereopsis image display mode is on, and control is performed such that in the event of on the flow proceeds to step S45, while if off, the flow proceeds to step S50.

Figure 9:
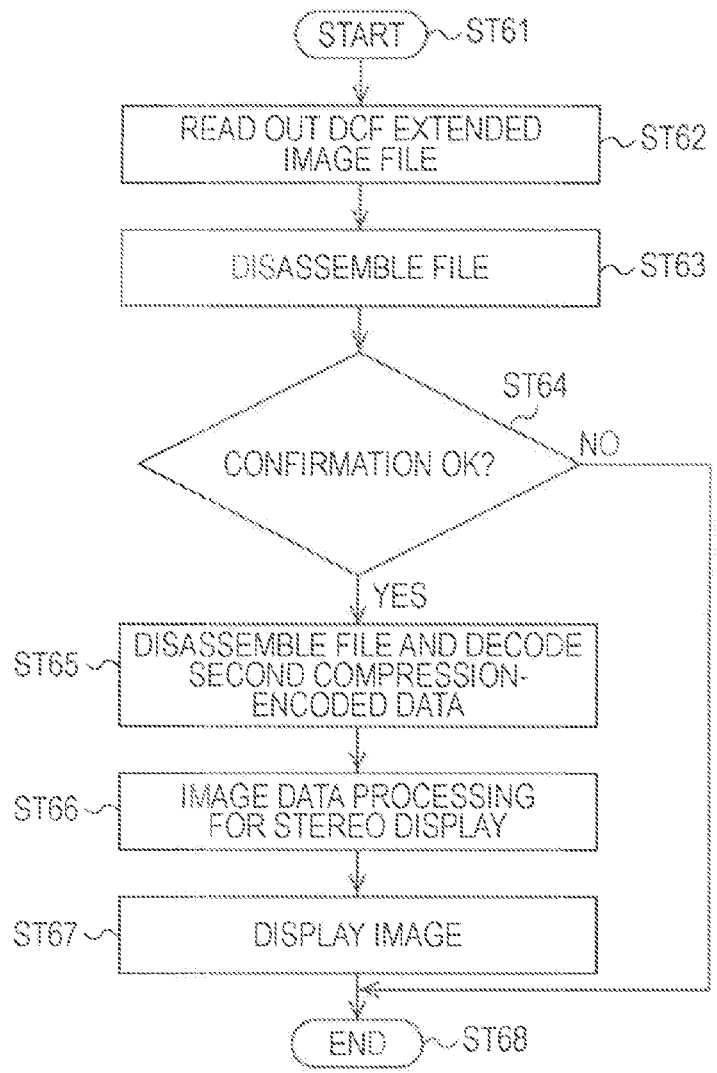
FIG. 9 is a flowchart illustrating yet another example of reproduction control at a control unit of a reproduction device having a display function of stereopsis images.

The flowchart in FIG. 9 illustrates yet another example of reproduction control at the control unit 201 of the reproducing device 300 in FIG. 6. Note that this example of reproducing is applied to a case wherein the first image file is recorded as a DCF basic file and the second image file is recorded as a DCF extended image file in the memory card 205.

The control unit 201 starts reproduction control in step S61, following which the flow proceeds to step S62.

The control unit 201 then in step S62 reads out the DCF extended image file (second image file) from the memory card 205 with the image data readout unit 204.

Next, in step S63, the control unit 201 disassembles the DCF extended image file read out in step S62 with the file disassembly unit 206, and obtains metadata and JPEG compressed image data (second compression-encoded data).

In step S64, the control unit 201 determines whether or not there the DCF extended image file read out in step S62 is a second image file including left and right image data.

In the event of confirming that this is the second image file, in step S65 the control unit 201 decodes the second compression-encoded data obtained in step S63 and obtains left and right image data.

Next, in step S66, the control unit 201 processes the left and right image data obtained in step S65 with the image data processing unit 208, and obtains image data for displaying a stereopsis image.

In step S67, the control unit 201 displays a stereopsis image (still image) from the image data obtained in step S66 on the display 209.

Following the processing of step S67, in step S68 the control unit 201 ends the reproducing processing. Note that in the event that confirmation is not made in step S64 described above that the file is the second image file, the flow immediately goes to step S68, and ends the reproducing processing.

Figure 10:
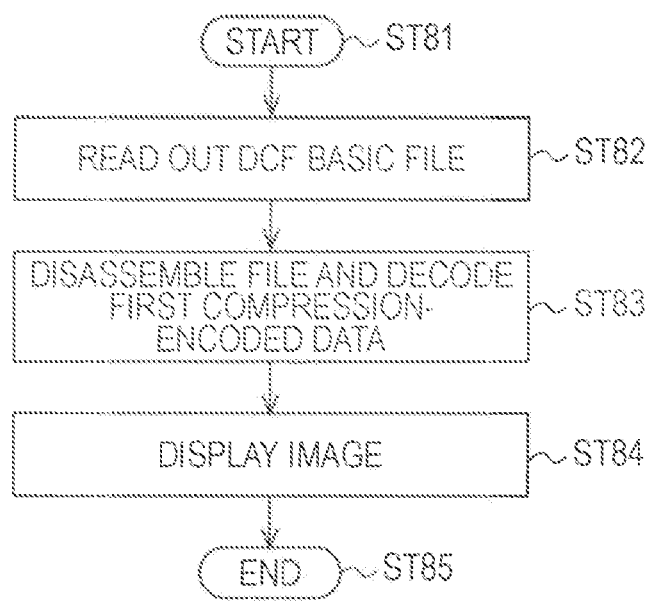
FIG. 10 is a flowchart illustrating an example of reproduction control at a control unit of a reproduction device having no display function of stereopsis images.

The flowchart in FIG. 10 illustrates an example of reproducing control at the control unit of a reproducing device not capable of displaying stereopsis images. Note that this example of reproducing is applied to a case wherein the first image file is recorded as a DCF basic file and in the memory card 205.

The control unit starts reproduction control in step S81, following which the flow proceeds to step S82.

The control unit then in step S82 reads out the DCF basic file (first image file) from the memory card 205.

Next, in step S83, the control unit disassembles the DCF basic file read out in step S82, and obtains metadata and JPEG compressed image data (first compression-encoded data). Also, in step S83, the control unit performs decoding of the first compression-encoded data by the decoder 207, and obtains the single image data.

In step S84, the control unit displays the image from the single image data (still image) obtained in step S83 on the display 209, and subsequently, in step S85, the reproducing processing ends.

Thus, due to the first image file including the single image data being recorded in the memory card 205 besides the second image file including the left and right image data, a stereopsis image can be displayed at reproducing devices capable of displaying stereopsis images, while on the other hand, good image display can be performed at reproducing devices not capable of displaying stereopsis images, as well.

Figure 11:
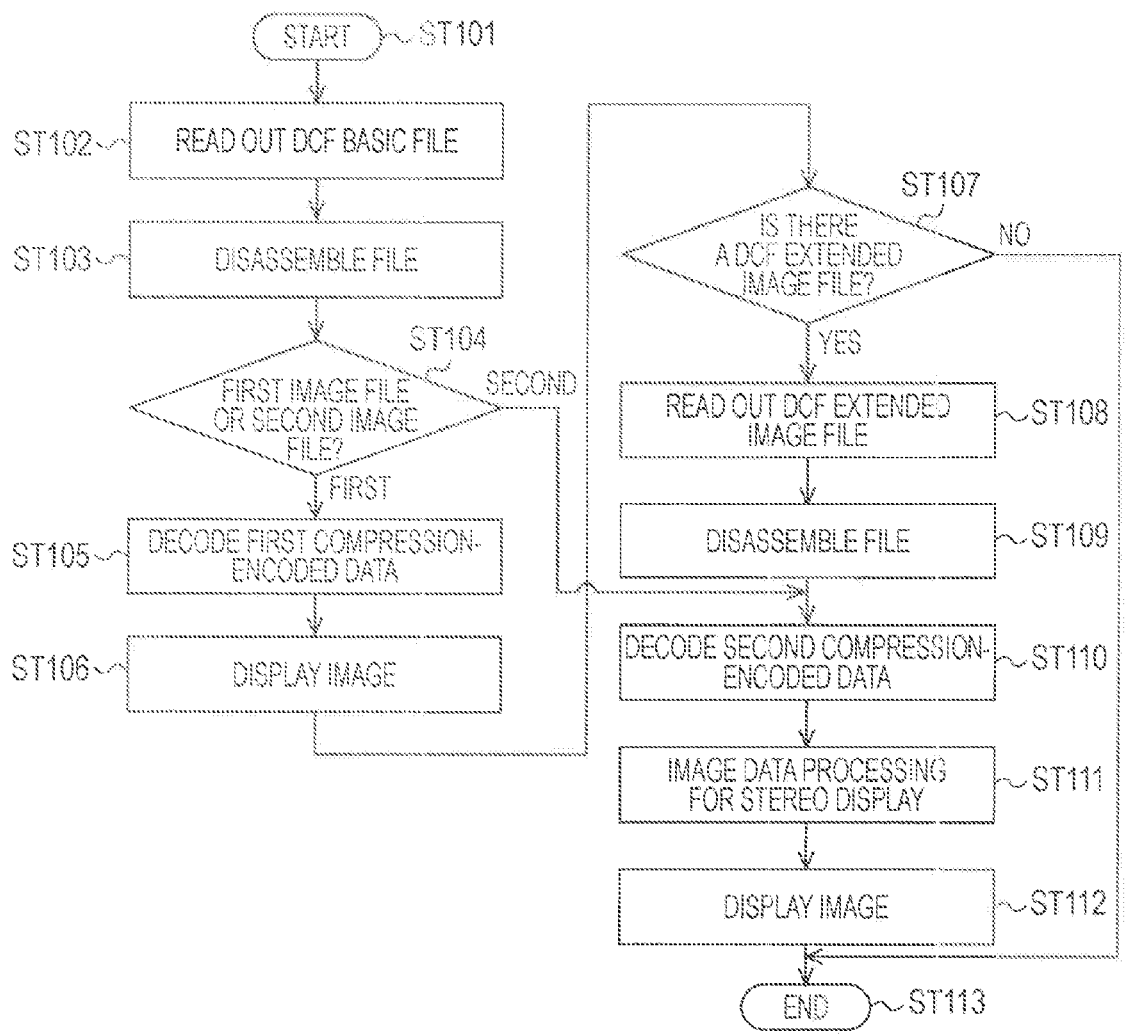
FIG. 11 is a flowchart illustrating another example of reproduction control at a control unit of a reproduction device having no display function of stereopsis images.

The flowchart in FIG. 11 illustrates a different example of reproduction control at the control unit 201 of the reproducing device 200 in FIG. 6. Note that this example of reproducing is applied to either a case wherein the first image file is recorded as a DCF basic file and the second image file is recorded as a DCF extended image file in the memory card 205, or a case wherein the first image file is recorded as a DCF extended image file and the second image file as a DCF basic file.

The control unit 201 starts reproduction control in step S101, following which the flow proceeds to step S102.

The control unit 201 then in step S102 reads out the DCF basic file (first image file) from the memory card 205 with the image data readout unit 204.

Next, in step S103, the control unit 201 disassembles the DCF basic file read out in step S102 with the file disassembly unit 206, and obtains metadata and JPEG compressed image data.

Next, in step S104, the control unit 201 determines whether or not the DCF basic file read out instep S102 is a first image file or a second image file. As described above, the first image file includes first compression-encoded data relating to the single image data, and the second image file includes second compression-encoded data relating to the left and right image data.

In the event of determining that this is the first image file, in step S105 the control unit 201 decodes the JPEG compressed image data (first compression-encoded data) obtained in step S103 and obtains single image data.

In step S106, the control unit 201 displays an image (still image) from the single image data obtained in step S105.

Next, in step S107 the control unit 201 determines whether or not there is a DCF extended image file corresponding to the memory card 205. In the event that there is a DCF extended image file, the file name and the like of the DCF extended image file is included in the metadata of the DCF basic file, as described above with FIG. 4. Accordingly, the control unit 201 can determine whether or not there is a DCF extended image file corresponding to the memory card 205, based on the metadata of the DCF basic file.

In the event of determining that there is a DCF extended image file, the control unit 201 reads out the DCF extended image file from the memory card 205 with the file readout unit 204 in step S108.

In step S109, the DCF extended image file read out in step S106 is disassembled by the file disassembly unit 206, and the metadata and JPEG compressed image data (second compression-encoded data) is obtained.

Next, in step S110 the control unit 201 decodes the second compression-encoded data obtained in step S109 and obtains left and right image data.

In step S111, the control unit 201 processes the left and right image data obtained in step S110 with the image data processing unit 208, and obtains image data for displaying a stereopsis image.

The control unit 201 displays a stereopsis image (still image) from the image data obtained in step S111 on the display 209 in step S112. Following the processing of step S112, in step S113 the control unit 201 ends the reproducing processing.

Note that in the event that determination is made in the above step S107 that there is no DCF extended image file, the control unit 201 immediately goes to step S113 and ends the reproducing control.

Also, in the event that determination is made in the above step S104 that the file is the second image file, the control unit 201 immediately proceeds to step S110, an as described above decodes the second compression-encoded data, obtains the left and right image data, processed the left and right image data to obtain image data for displaying a stereopsis image, and displays the stereopsis image (still image) on the display 209.

AS described above, with the reproducing device 200 shown in FIG. 6, the first and second image files or the second image file can be read out as appropriate and image display can be performed.

Editing Device

Figure 12:
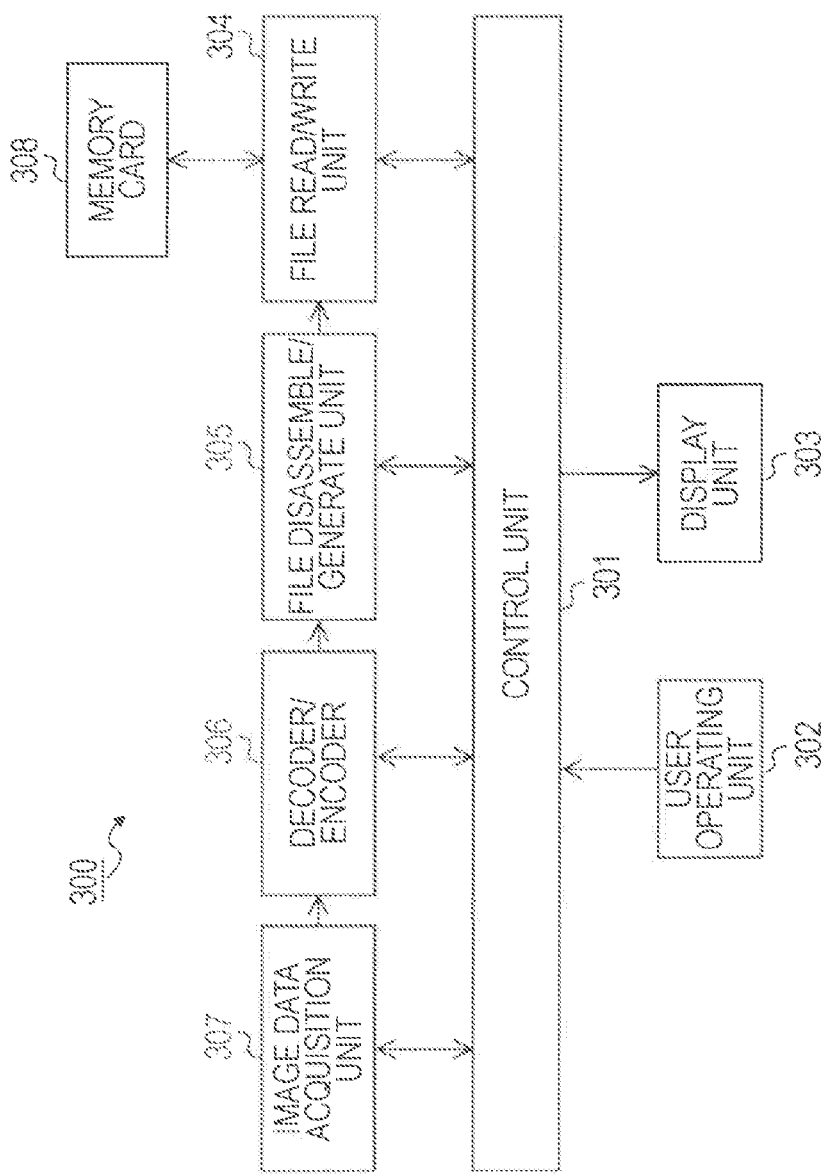
FIG. 12 is a block diagram illustrating a configuration example of an editing device as an embodiment of the present invention.

FIG. 12 illustrates a configuration example of the editing device 300. This editing device 300 includes a control unit 301, a user operating unit 302, a display unit 303, a file read/write unit 304, a file disassemble/generate unit 305, a decoder/encoder 306, and an image data processing unit 307. This editing device 300 is configured of a personal computer, for example.

The control unit 201 controls the operations of the parts of the editing device 300. The user operating unit 302 and display unit 303 make up a user interface, and are connected to the control unit 301. The user operating unit 302 is configured of keys or buttons disposed to an unshown housing of the editing device 300, or of a touch panel disposed on the display face of the display unit 303, or the like. The display unit 303 is configured of a flat panel display such as an LCD, PDP, or the like.

The memory card 308 makes up a recording medium. This memory card 308 corresponds to the memory card 109 in the recording device 100 described above. The memory card 308 records the first image file including the single image data, and the second image file including the left and right image data, in a correlated manner. For example, the first image file is the DCF basic file or the DCF extended image file, and on the other hand the second image file is the DCF extended image file or the DCF basic file, with the first image file and the second image file being recorded in the memory card 308 in a state of making up a DCF object.

The file readout unit 304 reads out file management information from the memory card 308 upon the memory card 308 being mounted, which is supplied to the control unit 301. The control unit 301 supplies display signals for displaying the file name of the files recorded in the memory card 308, to the display unit 303, so that the file names are displayed on the display unit 303. The user can select the DCF object to be reproduced from the user operating unit 302, making reference to the file names displayed on the display unit 203.

The file read/write unit 304 reads out the DCF files relating to the DCF object which the user has selected as described above. The file read/write unit 304 reads out either one or both of the first image file and second image file, under editing control. Note that as described above, there are cases where the first image file is the DCF basic file and the second image file is the DCF extended image file and cases where the opposite is true.

Also, the file read/write unit 304 writes the first image file and second image file generated at the file disassemble/generate unit 305, to the memory card 308. In this case, the first image file and second image file may be overwritten with the same file names as the first image file and second image file read out from the memory card 308 as described above, or may be written as a separate DCF object with different file names as the first image file and second image file read out from the memory card 308 as described above.

The file disassemble/generate unit 305 disassembles the DCF file (DCF basic file and DCF extended image file) read out at the file read/write unit 304, and obtains metadata and JPEG compressed image data. The file disassemble/generate unit 305 generates a first image file including the first compression-encoded data relating to the single image data generated at the decoder/encoder 306, and also generates a second image file including the second compression-encoded data relating to the left and right image data generated at the decoder/encoder 306.

In this case, the types (DCF basic file and DCF extended image file) of the first and second image files are in the same relation as the DCF files read out from the memory card 308 by the file read/write unit 304 as described above. Also, the file names of the first and second image files are the same as the file names of the DCF files read out from the memory card 308 by the file read/write unit 304 as described above (case of overwriting) or different (case of writing as separate DCF object).

The decoder/encoder 306 performs decoding on the JPEG compressed image data obtained at the file disassemble/generate unit 305 and obtains left and right image data to be edited. Also, the decoder/encoder 306 performs JPEG compression encoding on the one image data selected from the left and right image data subjected to editing processing at the image data processing unit 307 (the single image data which is the representative image data representing the left and right image data), thereby generating the first compression-encoded data. Also, the decoder/encoder 306 composites the left and right image data subjected to encoding processing at the image data processing unit 307, subjects the composited image data to JPEG compression encoding, thereby generating the second compression-encoded data.

The image data processing unit subjects to editing the left and right image data to be edited that is obtained from the decoder/encoder 306, and supplies the post-editing-processing left and right image data to the decoder/encoder 306. Editing processing is, for example, processing for cropping a portion of the image, processing for enlarging a portion of the image, processing for reducing the image, processing for changing the brightness, chromaticity, hue, etc., of the image, and so forth.

The operations of the editing device 300 shown in FIG. 12 will now be described. At the file readout unit 304, the DCF files (DCF basic file and DCF extended image file) relating to the DCF object which the user has selected are read out. At this time, the file read/write unit 304 reads out either one or both of the first image file and second image file, under editing control. Note that as described above, there are cases where the first image file is the DCF basic file and the second image file is the DCF extended image file and cases where the opposite is true. The DCF files read out at the file read/write unit 304 are supplied to the file disassemble/generate unit 305.

At the file disassemble/generate unit 305, the DCF files (DCF basic file and DCF extended image file) read out at the file read/write unit 304 are disassembled, and metadata and JPEG compressed image data are obtained. The metadata is supplied to the control unit 301. The control unit 301 can obtain various types of information relating to the DCF files read out at the file read/write unit 304, from the metadata. The JPEG compressed image data (second compression-encoded data) obtained at the file disassemble/generate unit 305 is supplied to the decoder/encoder 306.

The decoder/encoder 306 performs decoding on the JPEG compressed image data supplied from the file disassemble/generate unit 305 and obtains left and right image data to be edited. The left and right image data obtained at the decoder/encoder 306 is supplied to the image data processing unit 307. At the image data processing unit 307, editing processing is performed on the left and right image data. This editing processing is performed in accordance with user operations with one or both of the let and right images displayed on the display unit (display) 303, for example. The post-editing-processing left and right image data is supplied to the decoder/encoder 306.

At the decoder/encoder 306, JPEG compression encoding is performed on the one image data selected from the post-editing-processing left and right image data (the single image data which is the representative image data representing the left and right image data), thereby generating the first compression-encoded data. Also, at the decoder/encoder 306, the post-editing-processing left and right image data is subjected to JPEG compression encoding, thereby generating the second compression-encoded data. The first compression-encoded data and second compression-encoded data generated at the encoder/decoder 306 are supplied to the file disassemble/generate unit 305.

At the file disassemble/generate unit 305, the first image file including the first compression-encoded data (JPEG compressed image data) and the second image file including the second compression-encoded data (JPEG compressed image data) are generated. The types of the first and second image files (DCF basic file and DCF extended image file) in this case are in the same relation as the DCF files read out from the memory card 308 by the file read/write unit 304 as described above. Also, the file names of the first and second image files are the same as the file names of the DCF files read out from the memory card 308 by the file read/write unit 304 as described above (case of overwriting) or different (case of writing as separate DCF object).

The first image file and second image file generated at the file disassemble/generate unit 305 are supplied to the file read/write unit 304. At the file read/write unit 304, the first image file and second image file are written to the memory card 308 in a correlated manner. In this case, the first image file and the second image file are written to the same DCF directory in the memory card 308.

The flowchart in FIG. 13 illustrates an example of editing control at the control unit 301 of the editing device 300 shown in FIG. 12. This example of editing control is applicable to both a case of the first image file being recorded in the memory card 308 as a DCF basic file and the second image file as a DCF extended image file, and a case of the first image file being recorded in the memory card 308 as a DCF extended image file and the second image file as a DCF basic file.

In step S121, the control unit 301 starts editing control, and subsequently advances to step S122.

In step S122 the control unit 301 performs readout of the DCF basic file from the memory card 308 with the file read/write unit 304. Also, in step S122 the control unit 301 disassembles the DCF basic file that has been read out, with the file disassemble/generate unit 305, and obtains metadata and JPEG compressed image data.

Next, in step S123, the control unit 301 determines whether the DCF basic file read out in step S122 is the first image file or second image file, based on the metadata obtained in step S122. As described above, the first image file includes first compression-encoded data relating to the single image data, and the second image file includes second compression-encoded data relating to the left and right image data.

In the event of determining that the file is the first image file, in step S124 the control unit 301 performs readout of the DCF extended image file from the memory card 308 with the file read/write unit 304. Also, in step S124, the control unit 301 disassembles the DCF extended image file that has been read out, with the file disassemble/generate unit 305, and obtains metadata and JPEG compressed image data (second compression-encoded data). Following the processing in step S124, the control unit 301 advances to step S125. Note that in the event of determining that the file is the second image file in step S123, the control unit 301 immediately advances to step S125.

In step S125, the control unit 301 decodes the compression-encoded data obtained in step S124, and obtains left and right image data to be edited.

Then in step S126, the control unit 301 performs editing of the left image data and the right image data. In this case, editing is performed so that the left and right image data agree.

Next, in step S127, the control unit 301 composites the left and right image data edited in step S126 to generate composite image data.

Subsequently, in step S128, the control unit 301 performs JPEG compression encoding on the composite image data, and generates the second compression-encoded data.

Next, in step S129, the control unit 301 generates the second image file including the second compression-encoded data generated in step S128, as a DCF extended image file (with suffix "XXX") or a DCF basic file (with suffix "JPG").

Then, in step S130, the control unit 301 writes the second image file generated in step S129 to a predetermined DCF directory in the memory card 308, with the file write/read unit 304.

Next, in step S131, the control unit 301 performs JPEG compression encoding the on one image data selected from the post-editing-processing left and right image data (the single image data which is the representative image data representing the left and right image data), thereby generating the first compression-encoded data (JPEG compressed image data).

In step S132, the control unit 301 generates the first image file including the first compression-encoded data generated in step S131 as the DCF basic file (with suffix "JPG") or DCF extended image file (with suffix "XXX").

Next, in step S133, the control unit 301 writes the first image file generated in step S132 to the above-described predetermined DCF directory in the memory card 308, with the file write/read unit 304.

Following the processing in step S133, in step S134 the control unit 301 ends the recording control.

As described above, with the editing device 300 shown in FIG. 12, the second image file is read out from the memory card 308, and following editing processing being performed on the left and right image data included in this second image file, the second image file including the post-editing-processing left and right image data is generated, and these first and second image files are written to the memory card 308. Thus, with the editing device 300 shown in FIG. 12, for the post-editing-processing single image data, that selected from the post-editing-processing left and right image data is used, with the single image data included in the post-editing-processing first file and the left and right image data included in the second file agreeing.

Note that with the above embodiment, the left and right image data obtained by imaging a subject from left and right viewpoints has been illustrated as the multiple image data obtained by imaging a subject from mutually different viewpoints, but is not restricted to this. That is to say, as for the multiple image data obtained by imaging a subject from mutually different viewpoints, image data obtained by imaging a subject from a greater number of viewpoints may be included, besides left and right image data obtained by imaging a subject from left and right viewpoints.

Also, with the above-described embodiment, erasing and copying of the DCF basic files and DCF extended image files listed in the memory card as DCF objects have not been described, but these DCF basic files and DCF extended image files are erased or copied in batch.

Also, with the above-described embodiment, an arrangement has been illustrated of recording in the recording medium the first image file including the single image data and the second image file including the left and right image data, as DCF files (DCF basic file and DCF extended image file), but the recording format is not restricted to this. However, the first image file and second image file have to be recorded in a correlated manner.

The present application contains subject matter related to that disclosed in Japanese Priority Patent Application JP 2007-127675 filed in the Japan Patent Office on May 14, 2007, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A recording device comprising:
    an encoding unit configured to perform compression encoding on single image data obtained by imaging a subject from a predetermined viewpoint to generate first compression-encoded data, and perform compression encoding on composite image data in which a plurality of image data obtained by imaging said subject from mutually different viewpoints have been composited, to generate second compression-encoded data;
    a file generating unit configured to generate a first image file including said first compression-encoded data generated at said encoding unit, and generate a second image file including said second compression-encoded data generated at said encoding unit; and
    a file writing unit configured to write said first image file and said second image file generated at said file generating unit, to a recording medium in a correlated manner.

2. The recording device according to claim 1; wherein said single image data is representative image data representing said plurality of image data, and is selected from said plurality of image data.

3. The recording device according to claim 2; wherein said second image file includes metadata;
    and wherein said file generating unit includes, in the metadata in said first image file, information indicating which of said plurality of image data said single image data is.

4. The recording device according to claim 2; wherein said second image file includes metadata;
    and wherein said file generating unit includes, in the metadata in said first image file, information indicating which of said plurality of image data said single image data is desired to be selected as.

5. The recording device according to claim 1; wherein said composite image data is composite image data wherein left and right image data obtained by imaging a subject from left and right viewpoints have been composited.

6. The recording device according to claim 1; wherein said first image file includes metadata;
    and wherein said file generating unit includes, in the metadata in said first image file, the file name of said second image file.

7. The recording device according to claim 1; wherein said second image file includes metadata;
    and wherein said file generating unit includes, in the metadata in said second image file, the file name of said first image file.

8. The recording device according to claim 1; wherein said file generating unit generates said first image file as a DCF basic file or a DCF extended image file, and generates said second image file as a DCF extended image file or a DCF basic file;
    and wherein said file writing unit writes said first image file and said second image file in the same DCF directory of said recording medium.

9. The recording device according to claim 8, further comprising:
    a user operating unit whereby a user selects which of said first image file and said second image file to take as said DCF basic file and which to take as said DCF extended image file.

10. A recording method comprising the steps of:
    compression encoding with an encoder unit single image data obtained by imaging a subject from a predetermined viewpoint to generate first compression-encoded data, and compression encoding of composite image data in which a plurality of image data obtained by imaging said subject from mutually different viewpoints have been composited, to generate second compression-encoded data;
    generating a first image file including said first compression-encoded data generated in said compression encoding, and generating a second image file including said second compression-encoded data generated in said compression encoding; and
    writing of said first image file and said second image file generated in said generating, to a recording medium in a correlated manner.

11. A reproducing device configured to handle a recording medium in which is recorded, in a correlated manner, a first image file including first compression-encoded data generated by performing compression encoding on single image data obtained by imaging a subject from a predetermined viewpoint, and a second image file including second compression-encoded data generated by performing compression encoding on a plurality of image data obtained by imaging said subject from mutually different viewpoints, said reproducing device comprising:
    a file readout unit configured to read out, from said recording medium, at least said first image file or said second image file;
    a decoding unit configured to decode compression-encoded data included in an image file read out by said file readout unit, and obtaining image data; and
    an image display unit configured to display image data obtained by said decoding unit.

12. The reproducing device according to claim 11, wherein said file readout unit reads out said first image file, and subsequently reads out said second image file;
    and wherein said decoding unit decodes said first compression-encoded data included in said first image file read out by said file readout unit and obtains said single image data, and subsequently decodes said second compression-encoded data included in said second image file read out by said file readout unit and obtains said plurality of image data;
    and wherein said display unit performs image display with said single image data obtained by said decoding unit, and subsequently performs display of a stereopsis image with said plurality of image data obtained by said decoding unit.

13. The reproducing device according to claim 11, wherein said file readout unit reads out said first image file, and subsequently reads out said second image file;
and wherein said decoding unit decodes said second compression-encoded data included in said second image file read out by said file readout unit and obtains said plurality of image data;
and wherein said image display unit performs display of a stereopsis image with said plurality of image data obtained by said decoding unit.

14. The reproducing device according to claim 11, wherein said file readout unit reads out said second image file;
and wherein said decoding unit decodes said second compression-encoded data included in said second image file read out by said file readout unit and obtains said plurality of image data;
and wherein said image display unit performs display of a stereopsis image with said plurality of image data obtained by said decoding unit.

15. The reproducing device according to claim 11, wherein said first image file is written as a DCF basic file or a DCF extended image file, and said second image file is written as a DCF extended image file or a DCF basic file, in said recording medium;
and wherein said file readout unit reads out said DCF basic file, and in the event that said DCF basic file is said first image file, further reads out said DCF extended image file;
and wherein said decoding unit, in the event that said DCF basic file read out by said file readout unit is said first image file, decodes said first compression-encoded data included in said first image file and obtains said single image data, and subsequently decodes said second compression-encoded data included in said second image file read out by said file readout unit and obtains said multiple image data,
and in the event that said DCF basic file read out by said file readout unit is said second image file, decodes said second compression-encoded data included in said second image file and obtains said multiple image data;
and wherein said image display unit, and in the event that said DCF basic file read out by said file readout unit is said first image file, performs image display with said single image data obtained by said decoding unit, and subsequently performs image display with said plurality of image data obtained by said decoding unit,
and in the event that said DCF basic file read out by said file readout unit is said second image file, performs image display with said plurality of image data obtained by said decoding unit.

16. A reproducing method for a reproducing device handling a recording medium in which is recorded, in a correlated manner, a first image file including first compression-encoded data generated by performing compression encoding on single image data obtained by imaging a subject from a predetermined viewpoint, and a second image file including second compression-encoded data generated by performing compression encoding on a plurality of image data obtained by imaging said subject from mutually different viewpoints, said method comprising the steps of:
reading out, from said recording medium, at least said first image file or said second image file;
decoding with a decoding unit compression-encoded data included in an image file read out in said reading out, and obtaining image data; and
displaying of image data obtained in said decoding.

17. An editing device for handling a recording medium in which is recorded, in a correlated manner, a first image file including first compression-encoded data generated by performing compression encoding on single image data obtained by imaging a subject from a predetermined viewpoint, and a second image file including second compression-encoded data generated by performing compression encoding on a plurality of image data obtained by imaging said subject from mutually different viewpoints, said editing device comprising:
a file readout unit configured to read out, from said recording medium, at least said second image file;
a decoding unit configured to decode compression-encoded data included in said second image file read out by said file readout unit, and obtaining said plurality of image data;
an image data processing unit configured to subject said plurality of image data obtained by said decoding unit to editing processing;
an encoding unit configured to perform compression encoding on composite image data in which said plurality of image data processed by said image data processing unit have been composited, to generate second compression-encoded data, and performing compression encoding on single image data which is representative image data representing said plurality of image data and which is selected from said plurality of image data, to generate said first compression-encoded data;
a file generating unit configured to generate said first image file including said first compression-encoded data generated at said encoding unit, and generating said second image file including said second compression-encoded data generated at said encoding unit; and
a file writing unit configured to write said first image file and said second image file generated at said file generating unit, to a recording medium in a correlated manner.

18. An editing method for an editing device handling a recording medium in which is recorded, in a correlated manner, a first image file including first compression-encoded data generated by performing compression encoding on single image data obtained by imaging a subject from a predetermined viewpoint, and a second image file including second compression-encoded data generated by performing compression encoding on a plurality of image data obtained by imaging said subject from mutually different viewpoints, said method comprising the steps of:
reading out, from said recording medium, at least said second image file;
decoding with a decoding unit compression-encoded data included in said second image file read out in said reading out, and obtaining said plurality of image data;
editing processing of said plurality of image data obtained in said decoding step;
compression encoding of composite image data in which said plurality of image data processed in said editing processing have been composited, to generate second compression-encoded data, and compression encoding of single image data which is representative image data representing said plurality of image data and which is selected from said plurality of image data, to generate said first compression-encoded data;
generating of said first image file including said first compression-encoded data generated in said compression encoding, and generating of said second image file including said second compression-encoded data generated in said compression encoding; and
writing of said first image file and said second image file generated in said generating, to a recording medium in a correlated manner.

* * * * *